United States Patent
Yamamoto et al.

(10) Patent No.: US 7,206,749 B2
(45) Date of Patent: Apr. 17, 2007

(54) METHOD AND SYSTEM FOR SELLING CONTENT

(75) Inventors: Hideki Yamamoto, Tokyo (JP); Masayuki Taniguchi, Tokyo (JP); Masaki Sato, Tokyo (JP); Norio Kondo, Tokyo (JP); Atsushi Ikeno, Kyoto (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 911 days.

(21) Appl. No.: 09/858,886

(22) Filed: May 17, 2001

(65) Prior Publication Data

US 2002/0019724 A1    Feb. 14, 2002

(30) Foreign Application Priority Data

May 18, 2000    (JP)    ............................. 2000-146345

(51) Int. Cl.
*G06Q 99/00*    (2006.01)
(52) U.S. Cl. ........................................................ 705/1
(58) Field of Classification Search .................... 705/1, 705/14; 717/168
See application file for complete search history.

(56) References Cited

U.S. PATENT DOCUMENTS

| | | | | | |
|---|---|---|---|---|---|
| 5,258,906 | A | * | 11/1993 | Kroll et al. ..................... | 705/2 |
| 5,629,980 | A | * | 5/1997 | Stefik et al. ................... | 705/54 |
| 5,636,276 | A | * | 6/1997 | Brugger ........................ | 705/54 |
| 5,649,013 | A | * | 7/1997 | Stuckey et al. ............... | 705/58 |
| 5,673,316 | A | * | 9/1997 | Auerbach et al. ............. | 705/51 |
| 5,790,785 | A | * | 8/1998 | Klug et al. .................... | 726/11 |
| 6,102,287 | A | * | 8/2000 | Matyas, Jr. ................... | 235/380 |

(Continued)

FOREIGN PATENT DOCUMENTS

| | | | |
|---|---|---|---|
| WO | WO 9821713 A2 | * | 5/1998 |
| WO | WO 200021087 A2 | * | 4/2000 |

(Continued)

OTHER PUBLICATIONS

"Liquid Audio Files Registration Statement for Public Offering," PR Newswire, Nov. 23, 1999.*

(Continued)

*Primary Examiner*—Jonathan Ouellette
(74) *Attorney, Agent, or Firm*—Rabin & Berdo, P.C.

(57) ABSTRACT

This invention provides a method and a system for selling content capable of ensuring a fair profit of a copyrighter of a creation in content. More specifically, this invention provides a method and a system for selling content for judging whether an user terminal has purchase information of each creation in content including one or two creations or more or not and for calculating forwarding charge of the content based on whether the user terminal has purchase information of each creation in the content or not, in forwarding the content to the user terminal. The method and system for selling content enable to circulate the creation itself in the content as the object of dealing and to gain profit directly from the user of content. Therefore, the copyrighter can gain the fair profit without being influenced by the achievement of the content including the creation. This is also to encourage the creative urge of the creator and to improve the creative level of the creator. In addition, since the user of content can purchase the content including the creation having the purchase information with cheap price, consumption activity is to be vitalized effectively.

12 Claims, 13 Drawing Sheets

U.S. PATENT DOCUMENTS

| | | | | |
|---|---|---|---|---|
| 6,640,304 B2 * | 10/2003 | Ginter et al. | ................ | 713/193 |
| 6,948,070 B1 * | 9/2005 | Ginter et al. | ................ | 713/193 |
| 2004/0103305 A1 * | 5/2004 | Ginter et al. | ................ | 713/200 |
| 2004/0128514 A1 * | 7/2004 | Rhoads | ....................... | 713/176 |

OTHER PUBLICATIONS

Morrissey, Jane, "Microsoft to cut process for corporate buyers." PC Week, v9, n30, p. 129, Jul. 27, 1992.*

* cited by examiner

FIG.2

| R21 | R22 | R23 |
|---|---|---|
| NUMBER | PURCHASE DATE | PURCHASE INFORMATION |
| 1 | JANUARY 1, 2000 | C2 |

FIG.3

| PURCHASE CONDITION PRESENTATION | | | PURCHASE Y/N |
|---|---|---|---|
| NAME | CONDITION (TERM, ETC.) | PRICE | |
| CREATION C2 | HALF A YEAR | 1,000 YEN | ☐ |
| CREATION C3 | ONE YEAR | 2,000 YEN | ☐ |
| | THREE YEARS | 3,000 YEN | ☐ |

( DECISION )

FIG.4

| NUMBER (R41) | TARGET CONTENT (R42) | PURCHASE INFORMATION (R43) | DISCOUNT RATE (R44) |
|---|---|---|---|
| 1 | C1 | C2 | 30% DISCOUNT OF C1 |
| 2 | C1 | C3 | 10% DISCOUNT OF C1 |
| 3 | C2 | C4 | HAVING INFORMATION ON C2 (100% DISCOUNT) |
| 4 | C4 | C5 | HAVING INFORMATION ON C4 (100% DISCOUNT) |
| 5 | C1 | C4 | 30% DISCOUNT OF C1 |
| 6 | C1 | C5 | 30% DISCOUNT OF C1 |
| 7 | C2 | C5 | HAVING INFORMATION ON C2 (100% DISCOUNT) |

FIG.6

| STEP | FLOW OF PROCESS | ARRAY B | ARRAY A |
|---|---|---|---|
| S62 | STORING RECORD IN WHICH TARGET CONTENT R42 IS C1 IN ARRAY B | 1,2,5,6 | BLANK |
| S64 | PICKING UP ONE RECORD FROM ARRAY B | 2,5,6 | BLANK |
| S67 | STORING RECORD 1 IN ARRAY A | 2,5,6 | 1 |
| S64 | PICKING UP ONE RECORD FROM ARRAY B | 5,6 | 1 |
| S64 | PICKING UP ONE RECORD FROM ARRAY B | 6 | 1 |
| S64 | PICKING UP ONE RECORD FROM ARRAY B | BLANK | 1 |

FIG.8(a)

| SELLING GAMES SCREEN | | | |
|---|---|---|---|
| TITLE | REGULAR PRICE | PURCHASE ? Y/N | DISCOUNT PRICE |
| "ADVENTURE OF ROBO-JIJI" | 8,000YEN | ☐ | |
| "COSMIC ADVENTURE" | 6,000YEN | ☐ | |
| "NEO BEIJING" | 7,000YEN | ☐ | |
| 〈TOTAL SUM〉 | | | |

( DISCOUNT CALCULATION )   ( GOING ON TO NEXT SCREEN )

INITIAL SCREEN FOR SELLING GAMES

FIG.8(b)

| SELLING GAMES SCREEN | | | |
|---|---|---|---|
| TITLE | REGULAR PRICE | PURCHASE ? Y/N | DISCOUNT PRICE |
| "ADVENTURE OF ROBO-JIJI" | 8,000YEN | ■ | |
| "COSMIC ADVENTURE" | 6,000YEN | ☐ | |
| "NEO BEIJING" | 7,000YEN | ☐ | |
| 〈TOTAL SUM〉 | 8,000YEN | | |

( DISCOUNT CALCULATION )   ( GOING ON TO NEXT SCREEN )

SCREEN AFTER SELECTING PRODUCT AND DEPRESSING DISCOUNT CALCULATION KEY

FIG.8(c)

| SELLING GAMES SCREEN | | | |
|---|---|---|---|
| TITLE | REGULAR PRICE | PURCHASE ? Y/N | DISCOUNT PRICE |
| "ADVENTURE OF ROBO-JIJI" | 8,000YEN | ■ | 5,600YEN |
| "COSMIC ADVENTURE" | 6,000YEN | ☐ | |
| "NEO BEIJING" | 7,000YEN | ☐ | |
| 〈TOTAL SUM〉 | 8,000YEN | | 5,600YEN |

DISCOUNT CALCULATION     GOING ON TO NEXT SCREEN

SCREEN AFTER CALCULATING DISCOUNT PRICE

FIG.10

| USER ID | NUMBER | PURCHASE DATE | PURCHASE CONTENTS |
|---------|--------|---------------|-------------------|
| U1 | 1 | JANUARY 1, 2001 | C2 |

R54 → USER ID, R51 → NUMBER, R52 → PURCHASE DATE, R53 → PURCHASE CONTENTS

FIG.13(a)

| SELLING GAMES SCREEN | | | |
|---|---|---|---|
| TITLE | REGULAR PRICE | PURCHASE ? Y/N | DISCOUNT PRICE |
| "ADVENTURE OF ROBO-JIJI" | 8,000YEN | ☐ | 5,600YEN |
| "COSMIC ADVENTURE" | 6,000YEN | ☐ | |
| "NEO BEIJING" | 7,000YEN | ☐ | |
| ⟨TOTAL SUM⟩ | | | |
| | | | GOING ON TO NEXT SCREEN |

INITIAL SCREEN FOR SELLING GAMES

FIG.13(b)

| SELLING GAMES SCREEN | | | |
|---|---|---|---|
| TITLE | REGULAR PRICE | PURCHASE ? Y/N | DISCOUNT PRICE |
| "ADVENTURE OF ROBO-JIJI" | 8,000YEN | ■ | 5,600YEN |
| "COSMIC ADVENTURE" | 6,000YEN | ☐ | |
| "NEO BEIJING" | 7,000YEN | ☐ | |
| ⟨TOTAL SUM⟩ | | | 5,600YEN |
| DISCOUNT CALCULATION | | | GOING ON TO NEXT SCREEN |

SCREEN AFTER SELECTING PRODUCT

METHOD AND SYSTEM FOR SELLING CONTENT

BACKGROUND OF THE INVENTION

The present invention relates to a system and method for selling such content as pictures, still pictures and computer games on such a network as the Internet.

The copyrighter's profit is usually ensured with permission to use such works, created by one creator, as sentences and pictures. However, the situation is different in the case of such content created by plural creators as, for example, computer games and the like which are created based on such plural works as characters, music and programs which are created individually. In this example, the character, music, or program is a subset part of the whole content, which is included in the game but is not equal to the whole name.

RELATED ART

In the case of this content, conventionally, a part of profit by selling content is returned to each copyrighter in a predetermined ratio.

However, in the above method for selling content, each copyrighter gains profit indirectly through the profit of the content and the profit of each copyrighter is influenced by the sales of the content. For example, in the case of computer games described above, however wonderful the characters and music in the games are, and however much creative value the characters and music in the games have, the profit returned to the creators of the characters and music may be lessened due to bad sales. To dissolve such trouble, a new system capable of circulating a creation itself in a content as an object of dealing and of gaining profit directly from a user of content is required.

An object of the present invention is to provide a novel and improved method and system for selling content capable of ensuring a fair profit of a copyrighter of a creation in a content.

SUMMARY OF THE INVENTION

To achieve the above object, according to a first aspect of the present invention, there is provided a method for selling content for judging whether a user terminal has purchase-record information of each creation in a content including one or two creations or more and for calculating a forwarding charge of the content based on whether the user terminal has purchase-record information of each creation in the content or not, in forwarding the content to the user terminal.

In addition, to achieve the above object, according to a second aspect of the present invention, there is provided a system for selling content including one or two creations or more. The system comprises: a user terminal having purchase-record information storing means for storing purchase-record information of the creations, purchase condition inquiry means for requesting a condition server to inquire in relation to conditions between the content and the purchase-record information and execution means for the content; a copyrighter terminal forwarding the purchase-record information to the user terminal; a content creator terminal creating content including one or two creations or more and forwarding the content to a content sales administration server; a content sales administration server having content storing means storing the content forwarded from the content creator terminal and sales administration means forwarding information including details and price of the content; and a condition server having condition storing means storing the relation in conditions between the content and the purchase-record information and calculating the price of content based on the purchase-record information and searching means for searching the condition storing means.

The method and system for selling content enables circulation of the creation itself, within the content, as the object of dealing and to gain profit directly from the user of content. Therefore, the copyrighter can gain a fair profit without being influenced by the achievement (quality) of the content including the creation. This is also to encourage the creative urge of the creator and to improve the creative level of the creator. In addition, since the user of content can purchase the content including the creation having the purchase-record information with a cheap price, consumption activity is vitalized effectively. Further, since it is not necessary for the creator of the content to negotiate with the copyrighter of the creation over money, trouble between the creator and the copyrighter can be avoided. Also, the range of creating content can be widened and the creative level of the content improved.

In addition, according to third aspect of the present invention, there is provided a system for selling content including one or two creations or more. The system comprises: a user terminal having a purchase condition inquiry means for requesting a condition server to inquire in relation to conditions between the content and the purchase-record information and execution means for the content; a copyrighter terminal forwarding the purchase-record information to the user terminal; a content creator terminal creating content including one or two creations or more and forwarding the content to a content sales administration server; a content sales administration server having content storing means storing the content forwarded from the content creator terminal and sales administration means forwarding information including details and price of the content; and a condition server having purchase-record information storing means for storing purchase-record information of the creations, condition storing means storing the relation in conditions between the content and the purchase-record information and calculating the price of the content based on the purchase-record information and searching means for searching the condition storing means.

In this system, since purchase-record information storing means are set not in a user terminal but in a condition server, even a terminal having a small capacity such as a mobile data terminal can function as a user terminal in this system and an effect identical to the system in the second aspect of the present invention can be achieved.

To achieve the above object, according to a fourth aspect of the present invention, there is provided a system for selling content including one or two creations or more. The system comprises: a user terminal having execution means for the content; a copyrighter terminal forwarding the purchase-record information to the user terminal; a content creator terminal creating content including one or two creations or more and forwarding the content to a content sales administration server; a content sales administration server having content storing means storing the content forwarded from the content creator terminal, purchase condition inquiry means for requesting a condition server to inquire in relation to conditions between the content and the purchase-record information, and sales administration means forwarding information including details and price of the content; and a condition server having purchase-record information storing means for storing purchase-record information of the creations, condition storing means storing the relation in conditions between the content and the purchase-record information and calculating the price of content based on the purchase-record information and searching means for searching the condition storing means.

In this system, since the purchase condition inquiry means are set not in a user terminal but in a content sales administration server, an effect identical to the systems in the second and third aspects of the present invention can be achieved. In addition, since it is not necessary for the user terminal to inquire in relation to conditions, the user can be notified the price of content immediately to select the content. Also, the storage capacity of the user terminal can be smaller.

Preferably, an authentication server for authenticating the validity of the user terminal, the copyrighter terminal, the content creator terminal, the content sales administration server and the condition server is included in the above system. In this configuration, tampering with data in exchanging information, especially in exchanging purchase-record information, among each terminal or each server can be avoided and ensure the reliability.

BRIEF DESCRIPTION OF THE DRAWINGS

The above and other features of the invention and the advantages will be better understood in view of the following description given in conjunction with the accompanying drawings which illustrate preferred embodiments. In the drawings:

FIG. 2 illustrates purchase-record information stored in purchase-record information storing means.

FIG. 3 illustrates a screen for purchasing the purchase-record information.

FIG. 4 illustrates a relation between the content stored in the condition storing means and the purchase-record information.

FIG. 6 illustrates an array A and an array B in calculating the price of the content.

FIG. 8 illustrates a screen for purchasing the content.

FIG. 8 (*a*) illustrates an initial screen for selling games.

FIG. 8 (*b*) illustrates a screen after selecting product and depressing discount calculation key.

FIG. 8 (*c*) illustrates a screen after calculating discount price.

FIG. 10 illustrates purchase-record information stored in purchase-record information storing means.

FIG. 13 illustrates a screen for purchasing the content.

DETAILED DESCRIPTION OF THE PREFERRED EMBODIMENTS

Figure 1:
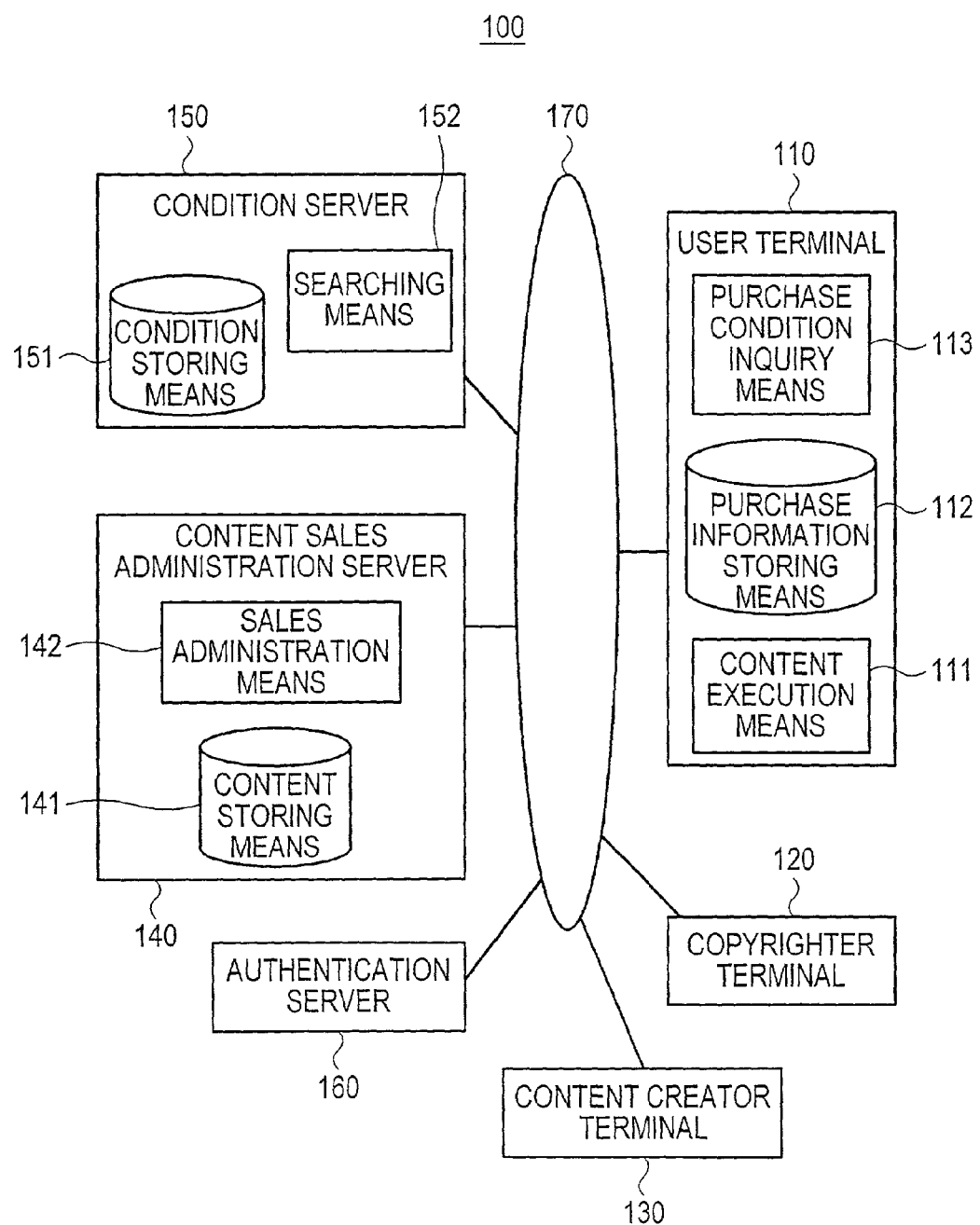
FIG. 1 illustrates a first embodiment of a system for selling content.

Hereinafter, the preferred embodiments of the present invention will be described in detail with reference to the accompanying drawings. Same reference numerals are attached to components having same functions in following description and the accompanying drawings and a description thereof is omitted.

In this specification, such software as computer games and music circulating through such a network as the Internet or on CD-ROMs as an object of dealing (e.g., commerce) is referred to as content. In many cases, numerous graphics, sounds and animation are in such a content as this. The present invention relates to a relation between the content and a creation such as graphics, sounds and animation included in the content.

An important point in the present invention is that a user purchases in advance the creation included in the content and keeps purchase-record information with regard to the creation. The user terminal obtains purchase-record information from a copyrighter terminal by purchasing the creation from the copyrighter terminal creating the creation. By keeping the purchase-record information, the user terminal can purchase a content including the creation at a discount price according to predetermined terms after obtaining the purchase-record information. In this specification, it is to be noted that purchasing a creation does not necessarily mean assignment of the creation and that a creation stated in this specification is not necessarily restricted to a creation protected by copyright. For example, novels with the copyright elapsed, creations which cannot be protected by copyright, and what is not regarded as creations under the Copyright Act, for example, a train schedule, can be dealt with in the system of the present invention.

First Embodiment

The explanation with regard to first embodiment of the present invention is provided in reference to FIGS. 1–6.

As shown in FIG. 1, a content selling system 100 comprises a user terminal 110 used by a user of content, a copyrighter terminal 120 used by a copyrighter of a creation, a contents creator terminal 130 used by a creator of content who created the content by using a creation, a content sales administration server 140, a condition server 150 and an authentication server 160, each of which are connected through a network 170. The user terminal 110, the copyrighter 120 and the contents creator terminal 130, which are shown one by one in FIG. 1, may be embodied by two or more. Actually, numerous terminals may be connected through the network 170.

(User Terminal 110)

The user terminal 110 comprises content execution means 111 for executing such content as computer games, animation and music. More specifically, voice playback equipment for a content of music and a computer game machine for a content of a computer game correspond to the content execution means 111.

Further, the user terminal 110 comprises purchase-record information storing means 112 and purchase condition inquiry means 113. The purchase-record information storing means 112 stores the purchase-record information kept by the user terminal 110. The purchase condition inquiry means 113 inquires of a condition server 150 to be described later about a relation between the purchase-record information kept by the user terminal 110 and conditions for purchasing content.

As shown in FIG. 2, the purchase-record information in the user terminal 110 is stored in the purchase-record information storing means 112. The purchase-record information comprises an identification number R21, a purchase date R22 showing the time and date on which the purchase-record information was forwarded to the user terminal 110, and the purchase-record information R23. In the example of FIG. 2, record 1 shows that the user of the content purchased a creation C2 on Jan. 1, 2000. The relation between the purchase-record information and the content including the creation is to be further described later.

(Copyrighter Terminal 120)

A creation is created in the copyrighter terminal 120. The creation is released to the content selling system 100 and used to create content by the contents creator terminal 130 to be described later. The copyrighter terminal 120 indicates the purchase condition shown in FIG. 3 and forwards this condition to the user terminal 110. The example of FIG. 3 shows the sales price of the creation determined according to the expiration of the valid period for purchasing the creation. The date and sales price of the purchase-record information can be set arbitrarily by the creator terminal 120. The creator terminal 120 forwards the purchase-record information to the user terminal 110 in response to the request of user terminal 110.

(Contents Creator Terminal 130)

The content creator terminal 130 creates content by using the creation created by the copyrighter terminal 120. For example, in creating a computer game as content, using such creation as characters, background music, stories and program. The content creator terminal 130 forwards the created content to the content sales administration server 140.

(Content Sales Administration Server 140)

The content sales administration server 140 sells content. It comprises content storing means 141 and sales administration means 142. The content storing means 141 stores the content forwarded from the content creator terminal 130. The sales administration means 142 shows the information for the content stored in the content storing means 141 to the user terminal 110. The information includes the information relating to the creation of the content and the information relating to the price of the content.

(Condition Server 150)

The condition server 150 stores the relation between the content and the purchase condition of the content. It comprises condition storing means 151 and searching means 152 for searching the condition storing means 151.

As shown in FIG. 4, the relation between the name of the object content and the creation in the content are stored in the condition storing means 151. The record of each content comprises an identification number R41, the object content's name R42, the purchase-record information's name R43, and the purchase condition of object content R42 in keeping the purchase-record information R43, for example, discount ratio R44.

In FIG. 4, the record 1 shows that when the user terminal 110 keeps the purchase-record information of creation C2, the user can purchase content C1 at 30% discount. Also, record 2 shows that when the user terminal 110 keeps the purchase-record information of creation C3, the user can purchase content C1 at 10% discount.

The relation can lead to an example that the content C1 corresponds to a computer game and the creations C2 and C3 to the characters and music in the game. Since the sales of one game are influenced by the characters and music in the game to a certain extent, it is appropriate to return the profit brought by large sales for the game to each copyrighter of the game. Therefore, the user terminal 110 having the purchase-record information on the creations C2 and C3, that is, the user terminal 110 having purchased the creations by paying the copyrighter of creations C2 and C3 can purchase the content C1 at a certain discount ratio.

In FIG. 4, record 3 shows that when the user terminal 110 keeps the purchase-record information of creation C4, content C2 can be purchased at 100% discount. This shows that the creations C2 can also be purchased by having the purchase-record information of the creation C4. Also, record 4 shows that when the user terminal 110 keeps the purchase-record information of creation C5, content C4 can be purchased at 100% discount. This shows that the creations C4 can also be purchased by having the purchase-record information on the creation C4.

The relation can lead to an example that the creator C5 corresponds to animation, the creation (content) C4 to a scene in the animation and the creation (content) C2 to the object in the scene, since the creation C5 includes the creation C4 and the creation C4 includes the creation C2.

Also, the contents of record 5 are led from those of the records 1 and 3, that is, the contents of record 5 show that when the user terminal 110 keeps the purchase-record information on the creation C4, the content C1 can be purchased at 100%×30%=30% discount. Similarly, the contents of record 6 are led from those of the records 4 and 5, that is, the contents of record 6 show that when the user terminal 110 keeps the purchase-record information on the creation C5, the content C1 can be purchased at 100%×30%=30% discount.

Further, the contents of record 7 are led from those of the records 3 and 4, that is, the contents of record 7 show that the user terminal 110 keeps the purchase-record information on the creation C5 and the content C2 can be purchased at 100%×100%=100% discount. Since the above examples are supposed to lead to that the creation C5 (animation) includes the creation C2 (the object in one scene of the animation), the purchase-record information of the creation C5 includes that of the creation C2.

The conditions of records described above, especially those of the relation between the object content R42 and the purchase-record information R43 and of the discount ratio R44 are determined by the creator of content or by the agreement between the creator of content and the copyrighter. The content sales administration server 140 may determine the conditions of each record. Also, like the records 5, 6 and 7, the conditions of which are determined automatically according to those of other records, they may be stored in the condition storing means 151 by the automatic generation of the condition server 150.

Figure 5:
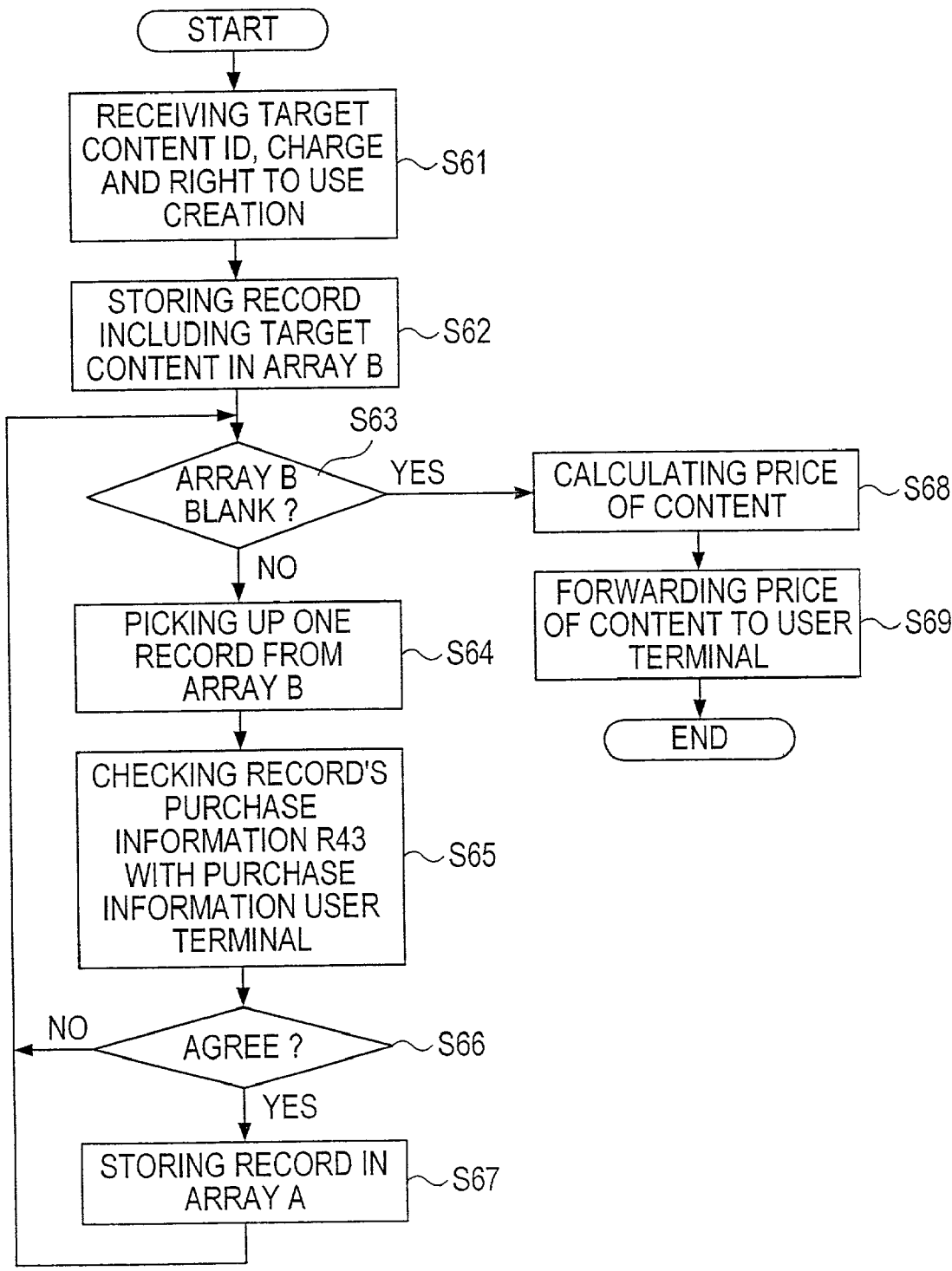
FIG. 5 illustrates a flow of calculating a price of the content.

Next, an explanation with regard to the calculation of the content's price based on the relation between the content stored in the condition storing means 151 and the purchase-record information is provided in reference to FIGS. 5 and 6. It is to be noted that the explanation is provided about the cases that the contents of the condition storing means 151 corresponding to that shown in FIG. 4, that the user terminal selects the content C1 and that the purchase-record information kept by the user terminal 110 is only that on the creation C2.

The condition server 150 receives the content ID of the content which are selected by the user terminal 110, the price of the content and the purchase-record information kept by the user terminal 110 from the user terminal 110 (step S61). It is to be noted that the price of the content may be received from the content sales administration server 140 in advance.

The searching means 152 search the record in which the object content R42 is C1 from among the records stored in the condition storing means 151. When the record stored in the condition storing means 151 has the contents shown in FIG. 4, the records 1, 2, 5 and 6 are stored in an array B (step S62). Here, the array B is a temporally memory in which the record stored in the condition storing means 151 is temporally stored. The transition in the array B is shown in FIG. 6.

The next step is to judge whether the array B is blank (step S63). If the array B is blank, the price of content is calculated (step S68) and the result of calculation is forwarded to the user terminal 110 (step S69). If the array B is not blank, one of the records is picked up from the array B (step S64). Then the record's purchase-record information R43 is checked as to whether it is the same as the purchase-record information forwarded from the user terminal 110 or not (step S65, S66).

As a result of judgement on step S66, if the record's purchase-record information R43 is the same to the purchase-record information forwarded from the user terminal 110, in other words, if the user terminal 110 keeps the purchase-record information R43, the record's discount ratio R44 is stored in an array A (step S67). Here, the array A is a temporary memory in which the record with the discount ratio applied is temporally stored. The transition in the array A is shown in FIG. 6. As a result of judgement on step S66, if the record's purchase-record information R43 is not same to the purchase-record information forwarded from the user terminal 110, the step returns to step S63.

The record's purchase-record information R43 is checked with the purchase-record information forwarded from the user terminal 110 to all of the records stored in the array B by repeating from step S63 to step S67 and the record in which the record's purchase-record information R43 matches with the purchase-record information forwarded from the user terminal 110 is stored in the array A.

On step S63, when the array B is blank, the price of content is calculated at the discount ratio in which the discount ratio R44 of each record are summed up (step S68). In this example, since only the record 1 is stored in the array A, the price of content C1 is 30% discount. Next, the result of the calculation is forwarded to the user terminal 110 (step S69).

(Authentication Server 160)

In reference to FIG. 1 again, the authentication server 160 administrates the information for authenticating whether the user terminal 110, the copyrighter terminal 120, the content creator terminal 130 and the content sales administration server 140, are registered properly to the system. The authentication server 160 also administrates the information for assuring that the purchase-record information has been forwarded without being tampered with in forwarding and receiving the information among the user information 110, the copyrighter terminal 120 and the condition server 150. In forwarding the information by using public key cryptography, for example, the authentication server 160 saves the public key of each terminal or server.

Figure 7:
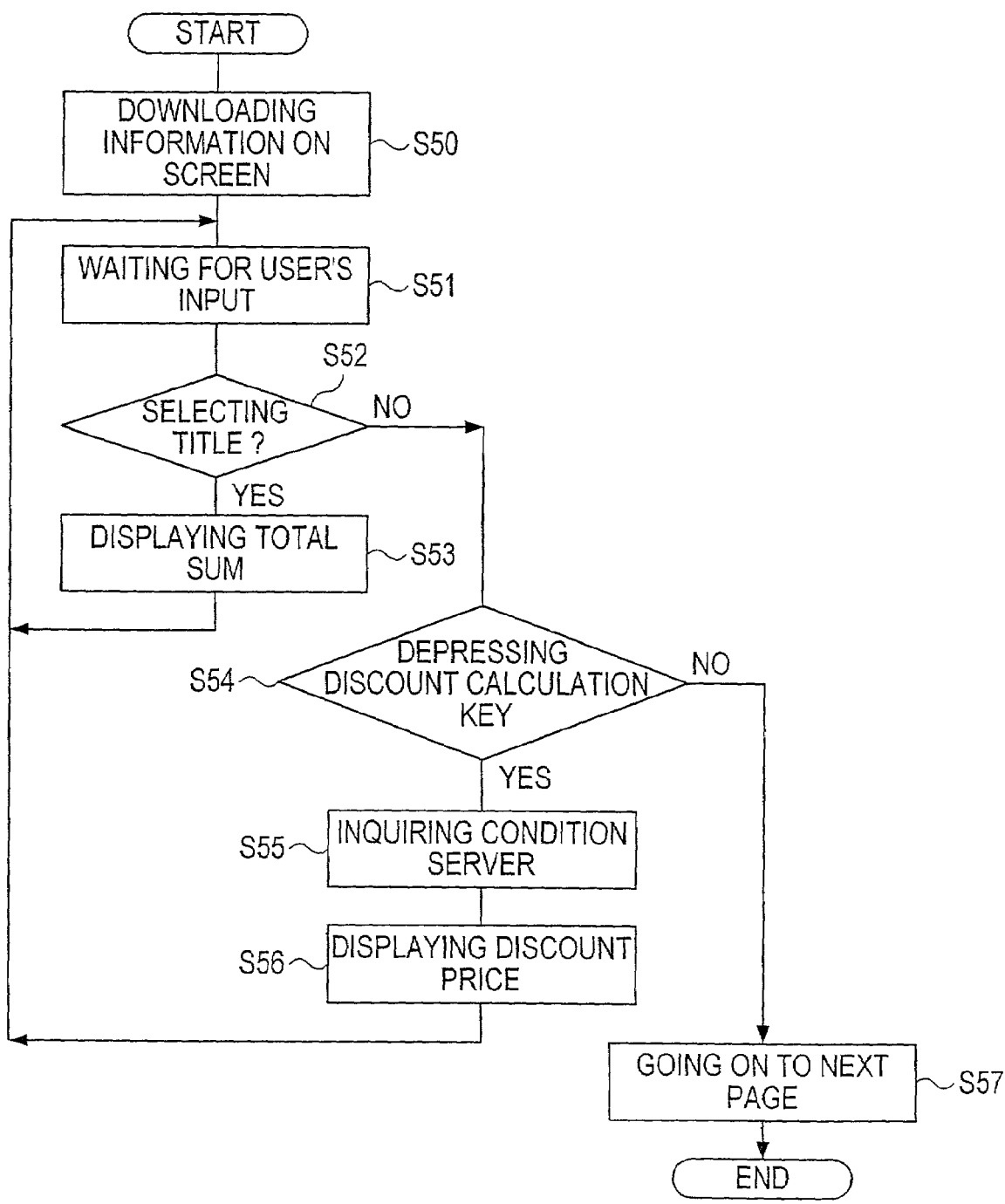
FIG. 7 illustrates a flow of purchasing the content.

The explanation with regard to the flow of actual selling content in the system is provided in reference to FIGS. 7 and 8. It is to be noted that FIG. 7 is the flow chart of selling content and that FIG. 8 is an example of a screen on the user terminal 110.

First, the user terminal 110 downloads the title of the content and the price of the content, and displays the screen (step S50). At this time, the screen (initial screen) shown in FIG. 8 (*a*) is displayed on the user terminal 110.

Next, the user terminal 110 waits for the user's input (step S51) and judges whether the input is a title selection (step S52). If the input is the title selection, the total sum of the selected titles' price is calculated and displayed (step S53). At this time, the screen shown in FIG. 8 (*b*) is displayed on the user terminal 110. FIG. 8 (*b*) shows the screen in which the content of a game named "Adventure of Robo-JiJi" has been selected. In this embodiment, the total sum is displayed as 8,000 yen on selecting the title.

Again, the user terminal 110 waits for the user's input (step S51) and the title selection by the user is repeated.

On step S52, if the input is not the title selection, in other words, if "discount calculation" key or "going on to next screen" key is depressed, the stage of title selection ends. The next step is to judge whether the "discount calculation" key has been depressed (step S54). As shown in FIG. 8 (*b*), when the "discount calculation" key has been depressed, the purchase condition inquiry means 113 forward the selected title and the purchase-record information stored in the purchase-record information storing means 112, and inquire of the condition server 150 (step S55).

The discount price is calculated by the condition server 150 according to the inquiry. The result is displayed on the user terminal 110 as shown in FIG. 8 (*c*) (step S56). This example shows that if the user terminal 110 keeps the purchase-record information on the creation, for example, characters in the "Adventure of Robo-JiJi", included in the "Adventure of Robo-JiJi", the user can purchase the content "Adventure of Robo-JiJi" at 30% discount.

Further again, the user terminal 110 waits for the user's input (step S51) and the title selection by the user and discount calculation by the user terminal are repeated.

As a result of the judgement of step S54, when the "discount calculation" key has not been depressed, in other words, when the "going on to next screen" key has been depressed, the process progresses to the following procedure (step S57). The process of the following procedure includes such a process as inputting a user ID and a password and a selecting method of paying.

In this embodiment, the creator can circulate the creation itself in the content as the object of dealing and gain profit directly from the user of the content. Therefore, the copyrighter can gain a fair profit without being influenced by the achievement of the content including the creation. In addition, the user can purchase the content including the creation the user having the purchase-record information with a cheaper price.

Second Embodiment

Figure 9:
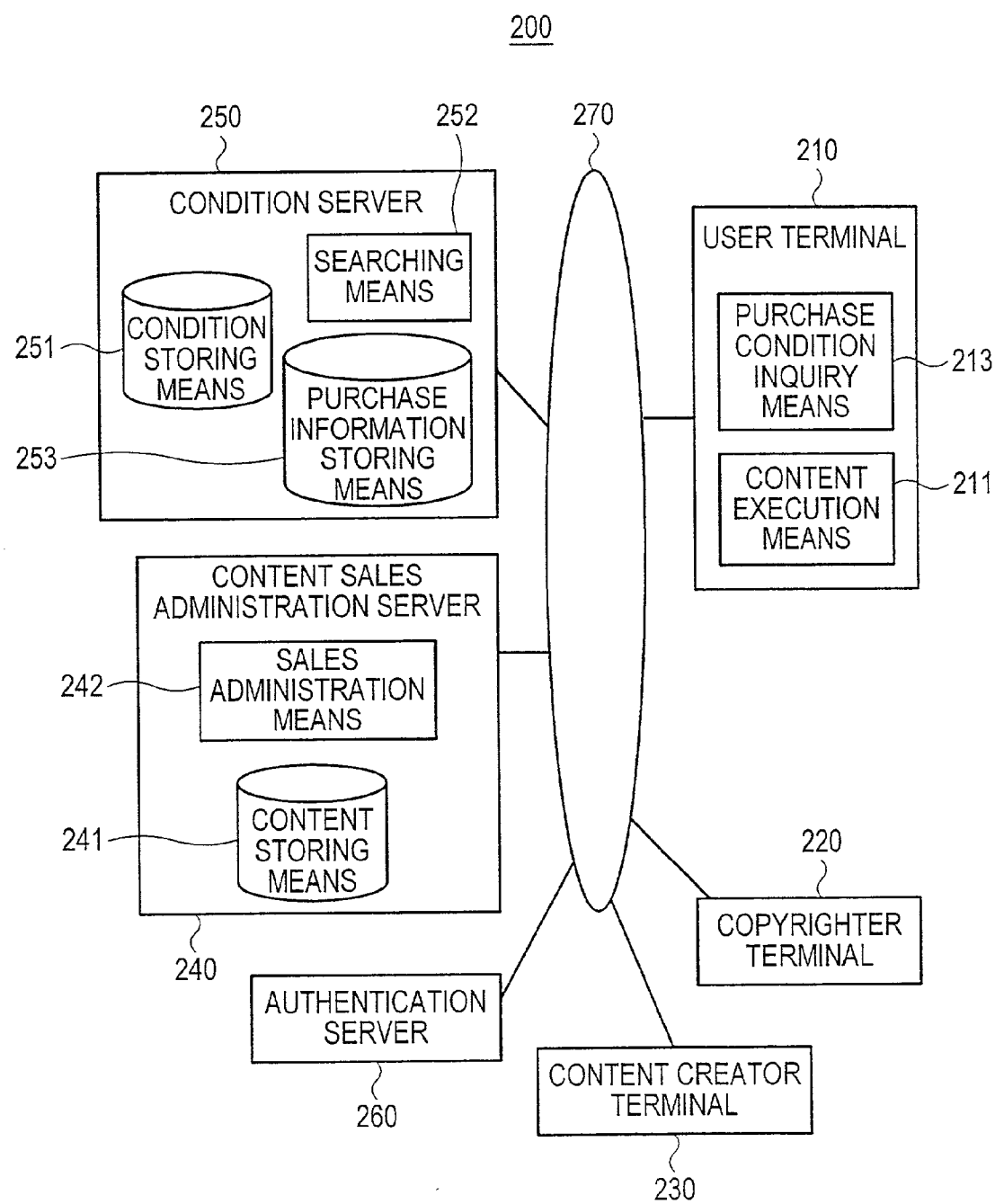
FIG. 9 illustrates a second embodiment of a system for selling content.
Figure 11:
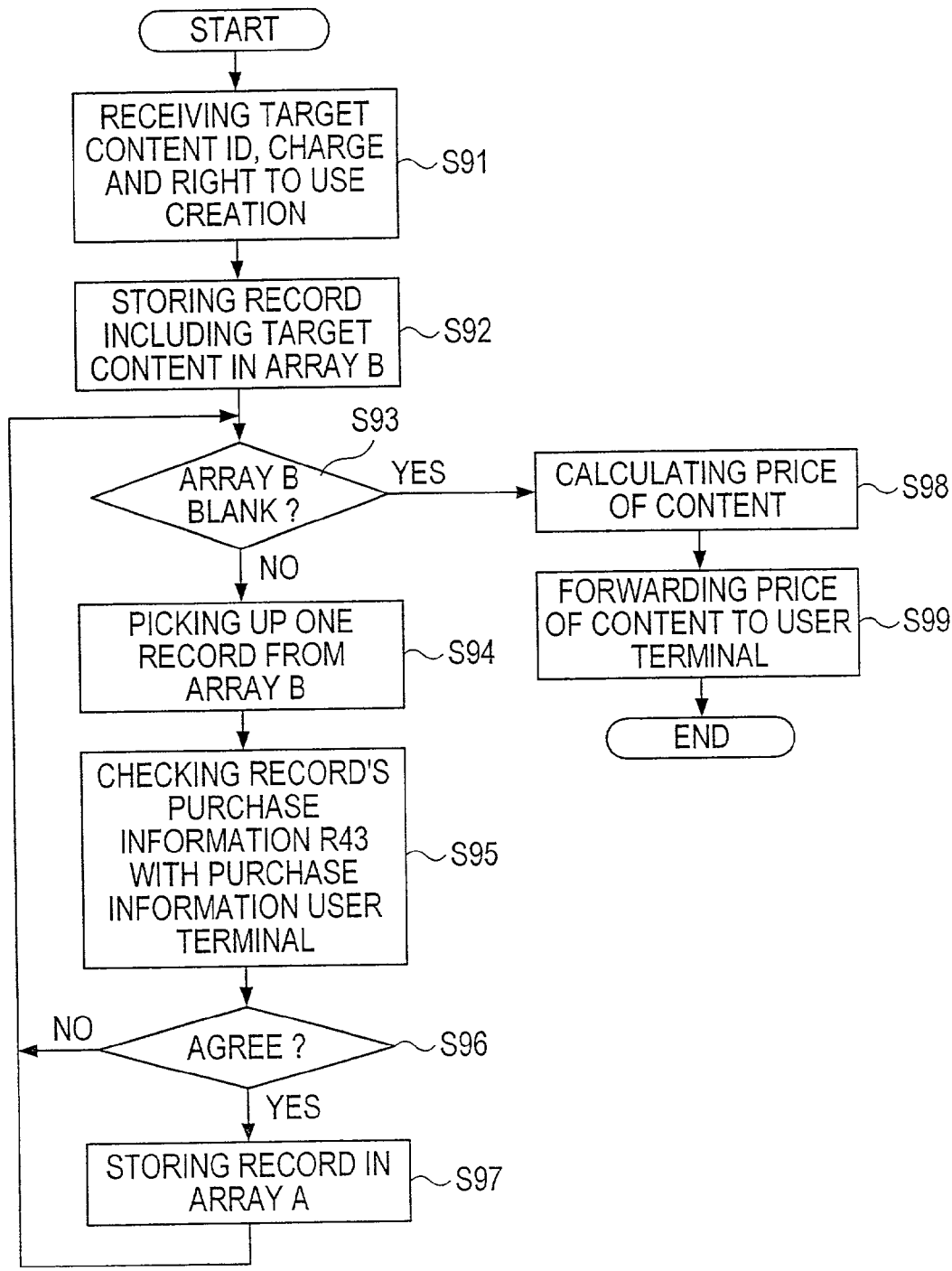
FIG. 11 illustrates a flow of calculating a price of the content.

The explanation with regard to the second embodiment of the present invention is provided in reference to FIGS. 9–11. This embodiment shows the configuration suitable for the case that since the user terminal has a small capacity the purchase-record information storing means 112 cannot be set in the user terminal, for example, the case that the user terminal is a mobile data terminal.

As shown in FIG. 9, a creation price calculation system 200 comprises a user terminal 210 used by a user of content, a copyrighter terminal 220 used by a copyrighter of a creation, a contents creator terminal 230 used by a creator of a content creating content by using a creation, a content sales administration server 240, a condition server 250 and an authentication server 260, each of which are connected through a network 270.

The user terminal 210 is comprised by eliminating the component corresponding to the purchase-record information storing means 112 from the user terminal 110 in the first embodiment and comprises content execution means 211 and purchase condition inquiry means 213. The content execution means 211 and the purchase condition inquiry means 213 are essentially identical to the content execution means 111 and the purchase condition inquiry means 113 in the first embodiment.

The copyrighter terminal 220, the content creator terminal 230, the authentication server 260 and the network 270 are essentially identical to the copyrighter terminal 120, the content creator terminal 130, the authentication server 160 and the network 170 in the first embodiment.

The condition server 250 is comprised by adding the component corresponding to the purchase-record information storing means 112 to the condition server 150 in the first embodiment and comprises condition storing means 251, searching means 252 and purchase-record information storing means 253.

The system of this embodiment is characterized in that the purchase-record information storing means are set not on the user terminal 210 but on the condition server 250, compared with the content selling system 100.

As shown in FIG. 10, the purchase-record information is stored in the purchase-record information storing means 253. The purchase-record information comprises an identification number R51, a purchase date R52 showing the time and date on which the user terminal 210 purchased the creation, the purchase-record information R53 and the user terminal ID R54. In the example of FIG. 10, record 1 shows that the user terminal 210 of user ID "U1" purchased a creation C2 on Jan. 1, 2000. The system of this embodiment is configured to be able to recognize to which user terminal the information stored in the purchase-record information storing means 253 belongs.

The example of the screen on the user terminal 210 and the flow of the process are identical to those of the first embodiment shown in FIG. 7. It is to be noted that in this embodiment the user terminal does not store the purchase-record information and that the discount price is calculated by forwarding the user terminal ID to the condition server 250.

Since the purchase-record information storing means are located on the condition server 250, the flow of process on the condition server 250 is as shown in FIG. 11. The difference from the process in the first embodiment is shown in steps S91 and S92. In this embodiment, the condition server 250 receives the content ID of the content selected by the user terminal 210, the price and the user terminal ID in step S91. The searching means 252 search the purchase-record information on the user terminal 210 based on the user terminal ID from the purchase-record information storing means 253. The following steps S93–99 are essentially identical to steps S63–69 in the first embodiment.

In this embodiment, since the purchase-record information storing means is located in the condition server 250, even a user terminal having a small capacity, such as a mobile data terminal, can function as the user terminal 210 in this system and the effect identical to the content selling system 100 in the first embodiment can be achieved.

Third Embodiment

Figure 12:
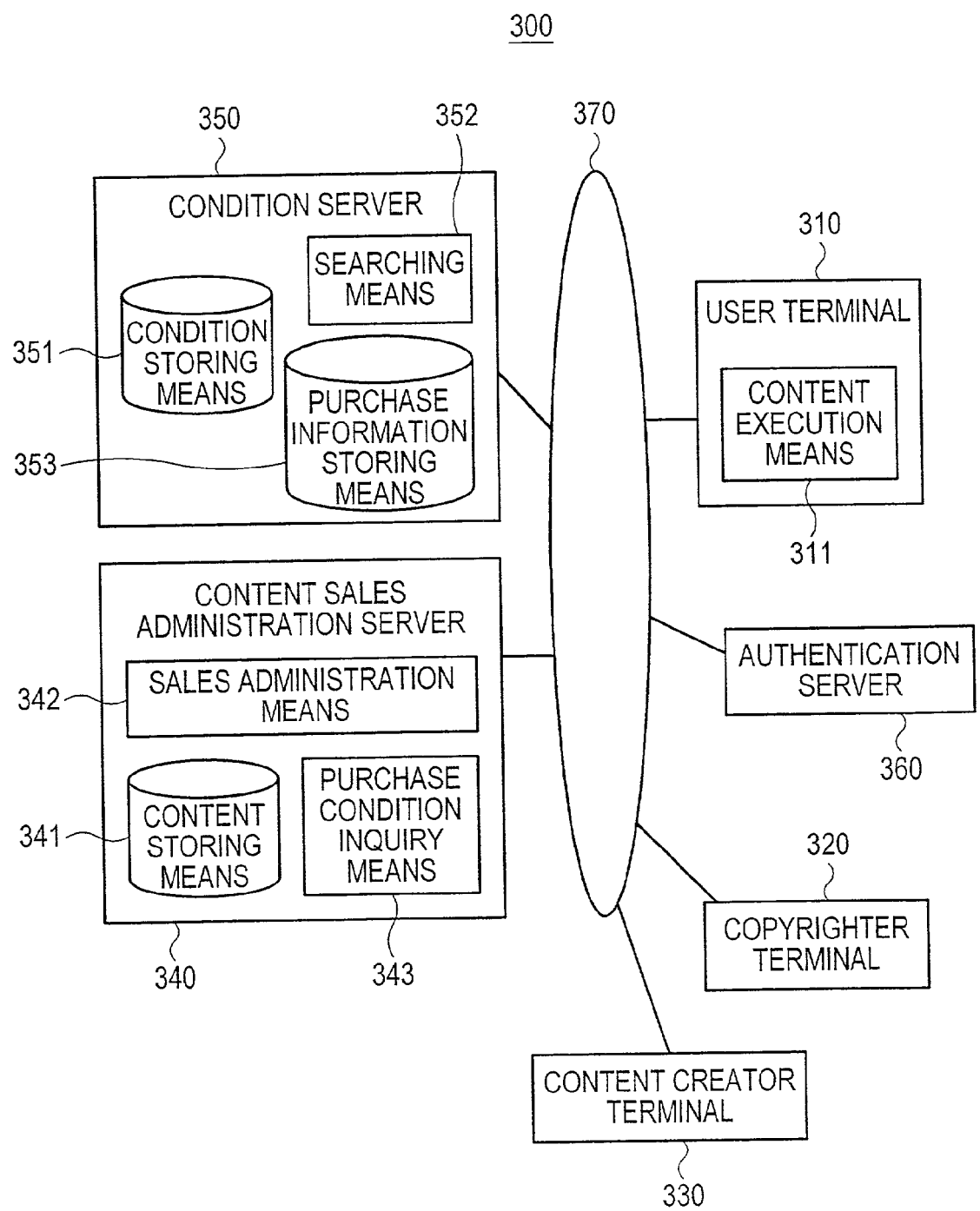
FIG. 12 illustrates third embodiment of a system for selling content.

The explanation with regard to third embodiment of the present invention is provided in reference to FIGS. 12–13.

As shown in FIG. 12, a creation price calculation system 300 comprises a user terminal 310 used by a user of the content, a copyrighter terminal 320 used by a copyrighter of a creation, a contents creator terminal 330 used by a creator of content creating content by using a creation, a content sales administration server 340, a condition server 350 and an authentication server 360, each of which are connected through a network 370.

The user terminal 310 is comprised by eliminating the component corresponding to the purchase condition inquiry means 213 from the user terminal 210 in the second embodiment and comprises content execution means 311. The content execution means 311 are essentially identical to the content execution means 211 in the second embodiment.

The copyrighter terminal 320, the content creator terminal 330, the authentication server 360 and the network 370 are essentially identical to the copyrighter terminal 220, the content creator terminal 230, the authentication server 260 and the network 270 in the second embodiment. In addition, the condition server 350 is essentially identical to the condition server 250 in the second embodiment and comprises condition storing means 351, searching means 352 and purchase-record information storing means 353.

The content sales administration server 340 is comprised by adding the component corresponding to the purchase condition inquiry means 213 to the content sales administration server 240 in the second embodiment. The content sales administration server 340 comprises content storing means 341, sales administration means 342 and purchase condition inquiry means 343.

In this configuration, the sales administration means 342 can inquire of the condition server 350 about the purchase-record information on the user terminal 310 before forwarding the information on content to the user terminal 310. Consequently, as shown in FIG. 13, the discount price can be presented on the screen of user terminal 310 at the stage of the initial screen for selling games.

In this embodiment, since purchase condition inquiry means are located in the content administration server 340, the effect identical to the content selling systems in the first and second embodiments can be achieved. In addition, since it is not necessary for the user terminal 310 to inquire in relation to conditions, the user can be notified of the price of the content immediately to select the content. Also, the storage capacity of the user terminal 310 can be smaller.

Although the preferred embodiments of the present invention has been described, the present invention is not restricted to such embodiments.

In the first embodiment, for example, the user terminal 110 inquires of the condition server 150 about only the discount price of selected content. However, the system can be so set that the user terminal 110 inquires of the condition server 150 about all the discount prices of the content displayed on the user terminal 110 to display. This is the same with the second embodiment.

What is claimed is:

1. A system for selling software content including at least one creation, wherein each creation is a subset part of the whole content, the system comprising:
   a user terminal including purchase-record information storing means for storing purchase-record information of the creations, purchase condition inquiry means for requesting a condition server to inquire about a relation in conditions between the software content and the purchase-record information, and execution means for the software content;
   a copyrighter terminal forwarding the purchase-record information to the user terminal;
   a software content creator terminal creating software content including at least one of the creations and forwarding the software content to a software content sales administration server;
   a software content sales administration server including software content storing means storing the software content forwarded from the software content creator terminal and sales administration means forwarding information including details and price of the software content; and a condition server including condition storing means storing the relation in conditions between the software content and the purchase-record information and calculating the price of software content based on the purchase-record information and searching means for searching the condition storing means.

2. A system for selling software content according to claim 1, wherein an authentication server for authenticating the validity of the user terminal, the copyrighter terminal, the software content creator terminal, the software content sales administration server and the condition server is included in the above system.

3. A system for selling software content according to claim 1, wherein the creation is copyrighted.

4. A system for selling software content according to claim 1, wherein the creation is individually copyrighted.

5. A system for selling software content including at least one creation, wherein each creation is a subset part of the whole content, the system comprising:

a user terminal including purchase condition inquiry means for requesting a condition server to inquire about a relation in conditions between the software content and the purchase-record information and execution means for the software content;

a copyrighter terminal forwarding the purchase-record information to the user terminal;

a software content creator terminal creating software content including at least one creations and forwarding the software content to a software content sales administration server;

a software content sales administration server including software content storing means storing the software content forwarded from the software content creator terminal and sales administration means forwarding information including details and price of the software content; and a condition server including purchase-record information storing means for storing purchase-record information of the creations, condition storing means storing the relation in conditions between the software content and the purchase-record information and calculating the price of software content based on the purchase-record information and searching means for searching the condition storing means.

6. A system for selling software content according to claim 5, wherein an authentication server for authenticating the validity of the user terminal, the copyrighter terminal, the software content creator terminal, the software content sales administration server and the condition server is included in the above system.

7. A system for selling software content according to claim 5, wherein the creation is copyrighted.

8. A system for selling software content according to claim 5, wherein the creation is individually copyrighted.

9. A system for selling software content including at least one creation, wherein each creation is a subset part of the whole content, the system comprising:

a user terminal including execution means for the software content;

a copyrighter terminal forwarding purchase-record information to the user terminal;

a software content creator terminal creating software content including at least one creations and forwarding the software content to a software content sales administration server;

a software content sales administration server including software content storing means storing the software content forwarded from the software content creator terminal, purchase condition inquiry means for requesting a condition server to inquire about a relation in conditions between the software content and the purchase-record information, and sales administration means forwarding information including details and price of the software content; and a condition server including purchase-record information storing means for storing purchase-record information of the creations, condition storing means storing the relation in conditions between the software content and the purchase-record information and calculating the price of software content based on the purchase-record information and searching means for searching the condition storing means.

10. A system for selling software content according to claim 9, wherein an authentication server for authenticating the validity of the user terminal, the copyrighter terminal, the software content creator terminal, the software content sales administration server and the condition server is included in the above system.

11. A system for selling software content according to claim 9, wherein the creation is copyrighted.

12. A system for selling software content according to claim 9, wherein the creation is individually copyrighted.

* * * * *